(12) United States Patent
Lasenby et al.

(10) Patent No.: US 11,042,991 B2
(45) Date of Patent: Jun. 22, 2021

(54) DETERMINING MULTIPLE CAMERA POSITIONS FROM MULTIPLE VIDEOS

(71) Applicant: Google LLC, Mountain View, CA (US)

(72) Inventors: Joan Lasenby, Cambridge (GB); Stuart Bennett, Cambridge (GB); Sasi Inguva, Mountain View, CA (US); Damien Kelly, San Francisco, CA (US); Andrew Crawford, San Francisco, CA (US); Hugh Denman, San Francisco, CA (US); Anil Kokaram, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/149,691

(22) Filed: Oct. 2, 2018

(65) Prior Publication Data
US 2019/0035090 A1    Jan. 31, 2019

Related U.S. Application Data

(63) Continuation of application No. 14/092,413, filed on Nov. 27, 2013, now Pat. No. 10,096,114.

(51) Int. Cl.
*G06T 7/246* (2017.01)
*H04N 17/00* (2006.01)
*G06T 7/73* (2017.01)

(52) U.S. Cl.
CPC ............ *G06T 7/246* (2017.01); *G06T 7/73* (2017.01); *H04N 17/002* (2013.01)

(58) Field of Classification Search
CPC . H04L 61/1594; H04L 65/1069; H04L 65/80; H04N 7/147; H04N 19/154; H04N 17/002; H04N 19/107; H04N 19/109; H04N 19/115; H04N 19/119; H04N 19/124; H04N 19/132; H04N 19/172; H04N 5/247; H04N 13/117; H04N 13/128; H04N 13/243; H04N 13/296; H04N 13/344; H04N 5/2258; H04N 5/23238; H04N 5/272; H04N 7/18; H04N 13/239; H04N 13/246; H04N 13/282; H04N 13/327; H04N 2005/2255; G06T 7/80; G06T 19/20; G06T 2207/10028; G06T 17/20; G06T 2207/10012;
(Continued)

(56) References Cited

U.S. PATENT DOCUMENTS 6,198,485 B1 * 3/2001 Mack .................. G06F 3/013
  345/419
6,856,708 B1   2/2005 Aoki
(Continued)

*Primary Examiner* — Nam D Pham
(74) *Attorney, Agent, or Firm* — Lowenstein Sandler LLP

(57) ABSTRACT

The technology disclosed herein includes a method for determining the position of multiple cameras relative to each other. In one example, the method may include: receiving, by a processor, a first video recording of a first camera and a second video recording of a second camera; selecting a set of frames of the first video recording; determining a blurriness measure for multiple frames of the set; identifying feature points in multiple frames of the set; selecting a frame from the set of frames based on the blurriness measure and the identified feature points; and determining a position of a first camera relative to a second camera by comparing the selected frame with a frame of the second video recording.

20 Claims, 12 Drawing Sheets

(58) Field of Classification Search
CPC . G06T 2207/30201; G06T 2207/30204; G06T 2207/30244; G06T 7/246; G06T 7/73
See application file for complete search history.

(56) References Cited

U.S. PATENT DOCUMENTS

| | | | | |
|---|---|---|---|---|
| 7,006,707 | B2* | 2/2006 | Peterson | G06T 3/005 382/285 |
| 7,054,491 | B2* | 5/2006 | McGuinness | G06T 7/33 382/209 |
| 7,224,357 | B2* | 5/2007 | Chen | G06T 7/593 345/420 |
| 7,379,621 | B2 | 5/2008 | Aoki | |
| 7,548,659 | B2* | 6/2009 | Ofek | G06T 5/005 348/208.99 |
| 8,532,421 | B2* | 9/2013 | Wang | G06T 5/003 382/255 |
| 8,773,548 | B2* | 7/2014 | Kobayashi | G06K 9/036 348/222.1 |
| 8,861,884 | B1 | 10/2014 | Fang | |
| 9,036,905 | B2 | 5/2015 | Fang | |
| 9,076,059 | B2 | 7/2015 | Leung | |
| 9,224,063 | B2* | 12/2015 | Lo | G06T 11/60 |
| 9,973,744 | B2* | 5/2018 | Acquavella | G06T 19/20 |
| 2002/0024516 | A1* | 2/2002 | Chen | G06T 7/593 345/419 |
| 2002/0181802 | A1* | 12/2002 | Peterson | G06T 3/005 382/284 |
| 2003/0095711 | A1* | 5/2003 | McGuinness | G06T 7/33 382/209 |
| 2004/0153671 | A1* | 8/2004 | Schuyler | G07C 9/00 726/9 |
| 2005/0105823 | A1 | 5/2005 | Aoki | |
| 2006/0257042 | A1* | 11/2006 | Ofek | G06T 5/005 382/255 |
| 2010/0002070 | A1 | 1/2010 | Ahiska | |
| 2010/0046830 | A1* | 2/2010 | Wang | G06T 7/12 382/164 |
| 2010/0178982 | A1* | 7/2010 | Ehrman | A63H 30/04 463/37 |
| 2010/0321246 | A1 | 12/2010 | Troesken | |
| 2011/0205022 | A1 | 8/2011 | Cavallaro | |
| 2011/0205077 | A1 | 8/2011 | Cavallaro | |
| 2011/0292219 | A1 | 12/2011 | Chang | |
| 2012/0035799 | A1* | 2/2012 | Ehrmann | A63H 17/00 701/28 |
| 2012/0121202 | A1* | 5/2012 | Wang | G06T 5/003 382/255 |
| 2012/0249826 | A1* | 10/2012 | Kobayashi | G06K 9/036 348/222.1 |
| 2013/0021434 | A1 | 1/2013 | Ahiska | |
| 2013/0148851 | A1 | 6/2013 | Leung | |
| 2013/0215221 | A1 | 8/2013 | Wang | |
| 2013/0215233 | A1 | 8/2013 | Wang | |
| 2014/0270537 | A1* | 9/2014 | Lo | G06T 11/60 382/195 |
| 2014/0285619 | A1 | 9/2014 | Acquavella | |
| 2014/0285624 | A1* | 9/2014 | Acquavella | G06T 19/20 348/46 |
| 2015/0021481 | A1 | 1/2015 | Cavallaro | |
| 2015/0030239 | A1 | 1/2015 | Fang | |
| 2016/0044299 | A1* | 2/2016 | Acquavella | G06T 19/20 348/46 |

* cited by examiner

DETERMINING MULTIPLE CAMERA POSITIONS FROM MULTIPLE VIDEOS

RELATED APPLICATIONS

This application is a continuation of application Ser. No. 14/092,413, filed Nov. 27, 2013, entitled "DETERMINING MULTIPLE CAMERA POSITIONS FROM MULTIPLE VIDEOS," which is incorporated by reference herein.

BACKGROUND

Video sharing is increasingly popular and many video delivery systems and social networks explicitly provide a video sharing function. For example, a video delivery system may allow individuals to upload videos of a specific event, such as a concert or sporting event. In some situations, many such event-related videos may be uploaded. The videos may be taken by non-professional videographers operating consumer-grade video recorders. While the videos may all relate to a specific event, the amateur nature of the videos may make subsequent viewing of the videos difficult.

SUMMARY

A method for determining the position of multiple cameras relative to each other includes at a processor, receiving video data from at least one video recording taken by each camera; selecting a subset of frames of each video recording, including determining relative blurriness of each frame of each video recording, selecting frames having a lowest relative blurriness, counting features points in each of the lowest relative blurriness frames, and selecting for further analysis, lowest relative blurriness frames having a highest count of feature points; and processing each selected subset of frames from each video recording to estimate the location and orientation of each camera.

DESCRIPTION OF THE DRAWINGS

The detailed description refers to the following figures in which like numerals refer to like items, and in which.

DETAILED DESCRIPTION

Figure 1:
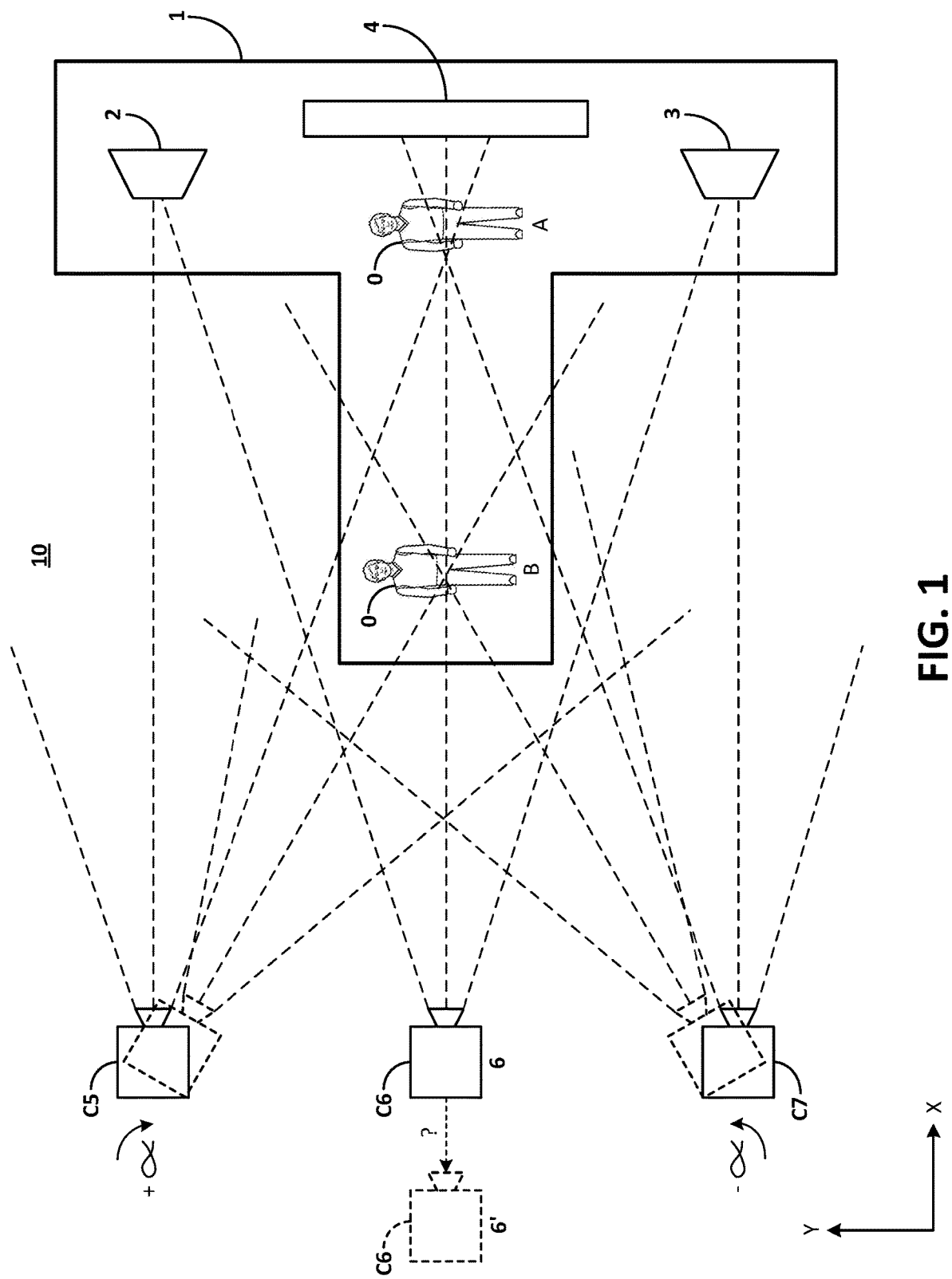
FIG. 1 illustrates an example environment in which positions of multiple cameras are estimated based on video clips recorded by multiple cameras.

A video delivery system may allow individuals to upload and share videos. Many individuals may upload videos for the same event, such as a concert or a sporting event. The individuals may record the event from widely varying locations (in two- or three-dimensions). Thus, multiple video cameras, each having unique, and sometimes widely varying, x, y, z, coordinates, may record the same event over an identical or similar period.

Amateur videos (i.e., those taken with consumer grade video cameras) represent a significant proportion of videos available on many online video delivery systems. For example, at a popular sporting event, dozens or hundreds of audience members may make video recordings using non-professional equipment such as smart phones or dedicated, but consumer-grade, video cameras. Many of these amateur videos may be uploaded to a video delivery system. However, the video delivery system may not be able to relate these many videos in a manner that allows a video delivery system user to efficiently and easily browse the videos. For example, when the videos are available online, a search may reveal all videos for an event, but picking which video(s) to watch may be an error-prone process. Presenting some geometric interpretation of the position from which the videos were recorded may be a useful interface to allow viewers to have a more informed choice as to which videos to view.

To improve an individual's video browsing experience, disclosed herein are systems and methods for estimating the position of multiple cameras used to record multiple videos. One aspect of the systems and methods is that the multiple videos may have a common time reference, such as a same wall clock start time. However, the systems and method do not require time synchronization between and among the multiple videos in order to estimate positions of the multiple cameras. The camera position estimates then may be used to relate videos of an event to each other. For example, a video clip of a walk off home run in a championship baseball game may be recorded by an individual behind home plate, an individual in left field, and an individual in right field. The positions of each of the three cameras may be estimated using the herein disclosed systems and methods. Furthermore, positions of the cameras may be used to relate each of the three video clips in a two- or three-dimensional space. Subsequently, a video delivery system user may be able to browse and view the three related videos of the winning home run based on data related to the estimated positions.

As used herein, a video includes a video clip, a video sequence, or any arrangement of video frames. Videos may be long (e.g., two hours) or short (e.g., seconds); many videos have a duration of about five minutes. A person, viewer, visitor, subscriber, or individual may access a video delivery system or other Web site to search for and view these videos.

As part of the position estimation process, the herein disclosed systems and methods address a challenge presented by the (usually) poor quality of typical consumer videos. In an embodiment, the systems use multiple frames in each video clip to improve the accuracy of camera position estimates. More specifically, the systems estimate (at least to within a few meters) camera locations, given unsynchronized video clips plausibly containing the same scene. The video clips likely will be recorded by nonprofessional camera operators without an intrinsic calibration of the camera's optical system. In addition, while a video clip may contain some metadata, the video metadata may not be as complete as that commonly included in files made by digital still cameras (digital still camera data files typically record camera model, image sensor dimensions, and focal length, for example). As a result, the herein disclosed systems may infer some or all necessary information from the video clip itself, while also addressing camera motion-blur and low quality optics, to produce improved quality camera position estimates.

The improved camera position estimates then may enable an event-based video browser, which may allow viewers to see not only what other people were watching but also where the other people were when they were recording the event. In the home run example cited above, a video delivery system may use the improved estimated camera positions to provide an enhanced browsing experience for baseball fans.

In an embodiment, the systems may use rotation of the video camera (e.g., the camera is panned (yawed, or pivoted) around its vertical axis (in reality, the camera also may be subject to pitch and roll effects, in addition to yaw, or panning)) to find the camera's location through, for example, a triangulation process. One aspect of such a location determination may be an assumption that the camera is not zoomed; that is, the camera lens remains at a fixed focal length. However, the systems may detect, and then compensate for, camera zoom. In a situation where no camera zoom is detected or assumed, the location of the camera may be estimated using a triangulation process. These two factors of rotation and zoom are referred to herein as orientation and scale.

The description that follows addresses camera position determination by estimating camera rotation in the x, y plane. However, the same or similar systems and methods may be used to estimate camera position based on rotation in any plane.

In an embodiment, a first aspect of a method for estimating camera positions begins by selecting a subset of frames of each of the multiple video clips on the basis of (1) sharpness, and (2) a number of feature points appearing in the sharp frames. This results in the selection of the most informative frames without invoking complicated multi-frame matching algorithms. Using the feature points as a further filter of the sharp frames is advantageous because the feature points themselves may be used for subsequent analysis in the methods. Furthermore, this aspect of the method exploits an assumption that if the video clips contain enough static background objects (e.g., concert walls, stadium buildings) then time synchronization of the videos is not necessary to extract position information.

A second aspect of the method determines matches between all frames of all video clips identified in the first aspect. In this second aspect, each frame of a video clip is compared to each frame of that video clip and to each of the frames from each of the other video clips. The comparison results may be displayed in a histogram. Frames belonging to a modal scale and orientation bin of the histogram then may be selected for further processing in the method.

In a third aspect, the method solves for focal lengths of each of the multiple cameras using a self, or internal, calibration based on rotations of the cameras.

FIG. 1 illustrates an example environment in which positions for multiple cameras are estimated based on video clips provided by multiple video cameras. In FIG. 1, environment 10 shows a concert setting with rock star 0 initially positioned at point A between towers 2 and 3 and backed by structure 4. Rock star 0 subsequently moves to position B. Attendees 5, 6, and 7 operate, respectively, video cameras C5, C6, and C7. As shown, the attendees 5 and 7 pivot (by angle α) their respective cameras C5 and C7 to follow the movement of rock star 0 from point A to point B. The cameras C5 and C7 are shown pivoting without translation (that is, the z-axis center points of the cameras remain at their initial x, y locations). However, the herein disclosed systems may provide camera position estimates even with some camera translation.

Camera C6 is operated without rotation (being focused on rock star 0).

As can be seen in FIG. 1, panning of the cameras C5 and C7 exposes the cameras to differing features points. For example, as camera C7 pans counter-clockwise, tower 2 comes within the view of the camera C7 and the perspective of structure 4 changes.

Rotation of the cameras C5 and C7 provides an opportunity to determine their x, y locations. The location of camera C6 may be unknown or undeterminable based only on operation of the camera C6. For example, the camera C6 could be in position 6 or position 6'. The ambiguity may result from the fact that during the recording, camera C6 may be at position 6' and zoomed, or at position 6 without zoom. However, the systems may estimate the position of camera C6 without any rotation by the camera. For example camera zooming will change the observed spacing between and among features points from frame to frame.

To estimate camera location, the video clips from cameras C5 and C7 may be processed by the herein disclosed systems generally as follows.

Video camera position estimation system 100 (see FIGS. 2A and 2B), receives as inputs, data for video clips v5 and v7 (from cameras C5 and C7, respectively). The video clips v5 and v7 may have a common time reference, such as a common wall clock start time.

For each video clip v5 and v7, the system 100 selects the sharpest frames in every time interval of a specified length, such as two seconds; identifies, for each sharp frame so selected, the number of feature points in that frame (using a feature point detection process such as a gradient change of a threshold amount); and selects a specified number of frames (e.g., 10 frames) having the most feature points (in FIG. 1, examples of feature points include edges of towers 2 and 3, and structure 4).

The system 100 then calculates feature point matches between all selected frames in clips v5 and all selected frames in v7. In an embodiment, the system 100 calculates matches between each of the 10N (in the example of FIG. 1, N=2) frames, filters the matches based on histograms of scale and orientation, and selects matches belonging to a modal scale and orientation to create filtered feature matches.

Then, for clip v5, the system 100 selects frame p having the most number of filtered feature matches with any other frame in clip v7. This step allows the system 100 to use data from frames most likely to produce the best estimate of camera position.

Next, the system 100 selects another frame q within a specified time (e.g., within two seconds, plus or minus) of frame p in the video clip v5 frame q having the properties of a) low blurriness according to a blurriness threshold; b) high number of feature matches (according to the filtered feature matches above); c) a non-zero apparent rotation (i.e., α>0 according to a rotation threshold); and d) no apparent scale change (zoom) between the two frames p and q, according to a scale threshold.

The system 100 uses frames p and q for each clip v5 and v7, and the filtered feature matches between the frames, to estimate camera focal parameters such as focal length.

Having estimated the camera focal parameters for each camera C5 and C7, the system 100 estimates the absolute location and orientation of the cameras C5 and C7 and the positions relative to each other.

The thus-estimated camera location and orientation data then may be used as an input to an event-based browser to guide viewers to video clips related to the same event.

Figure 2A:
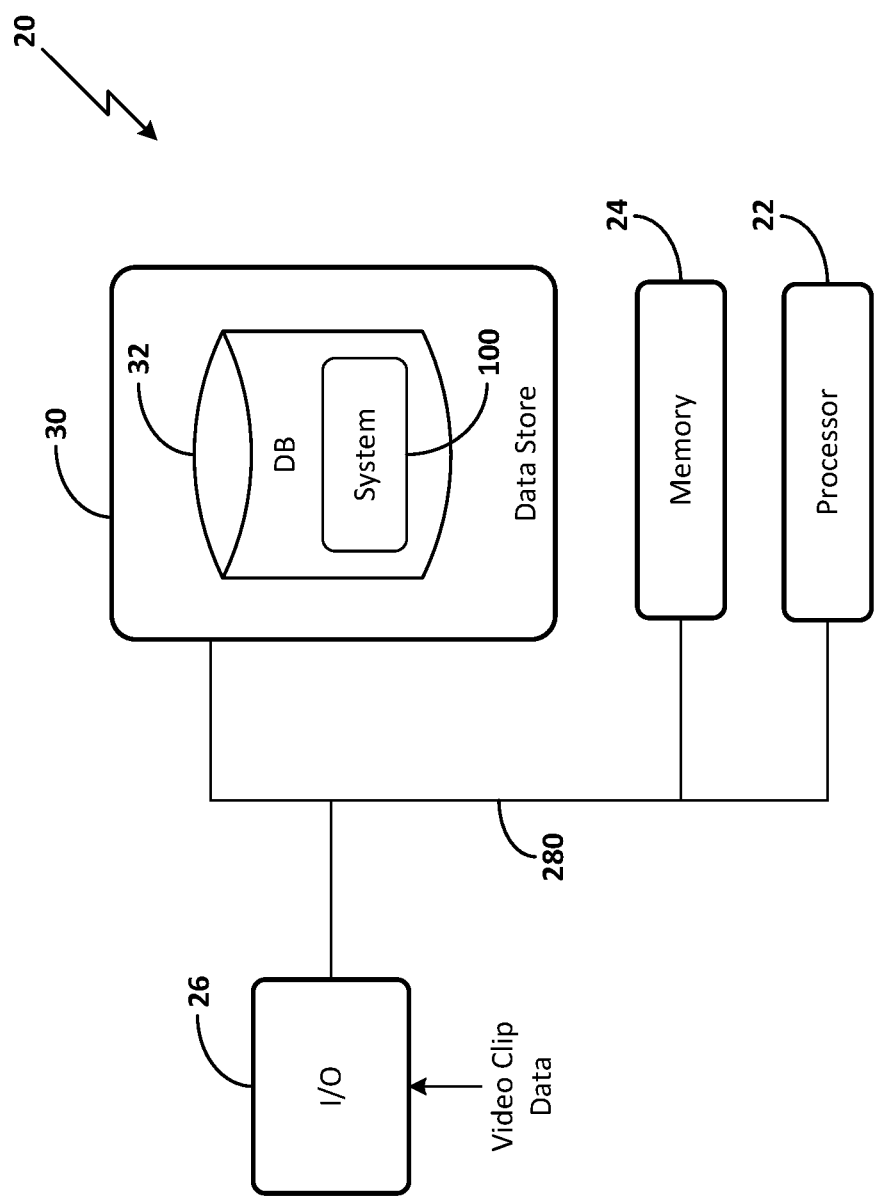
FIGS. 2A-2C illustrate an example system for estimating positions of multiple cameras based on video clips recorded by multiple cameras.
Figure 2B:
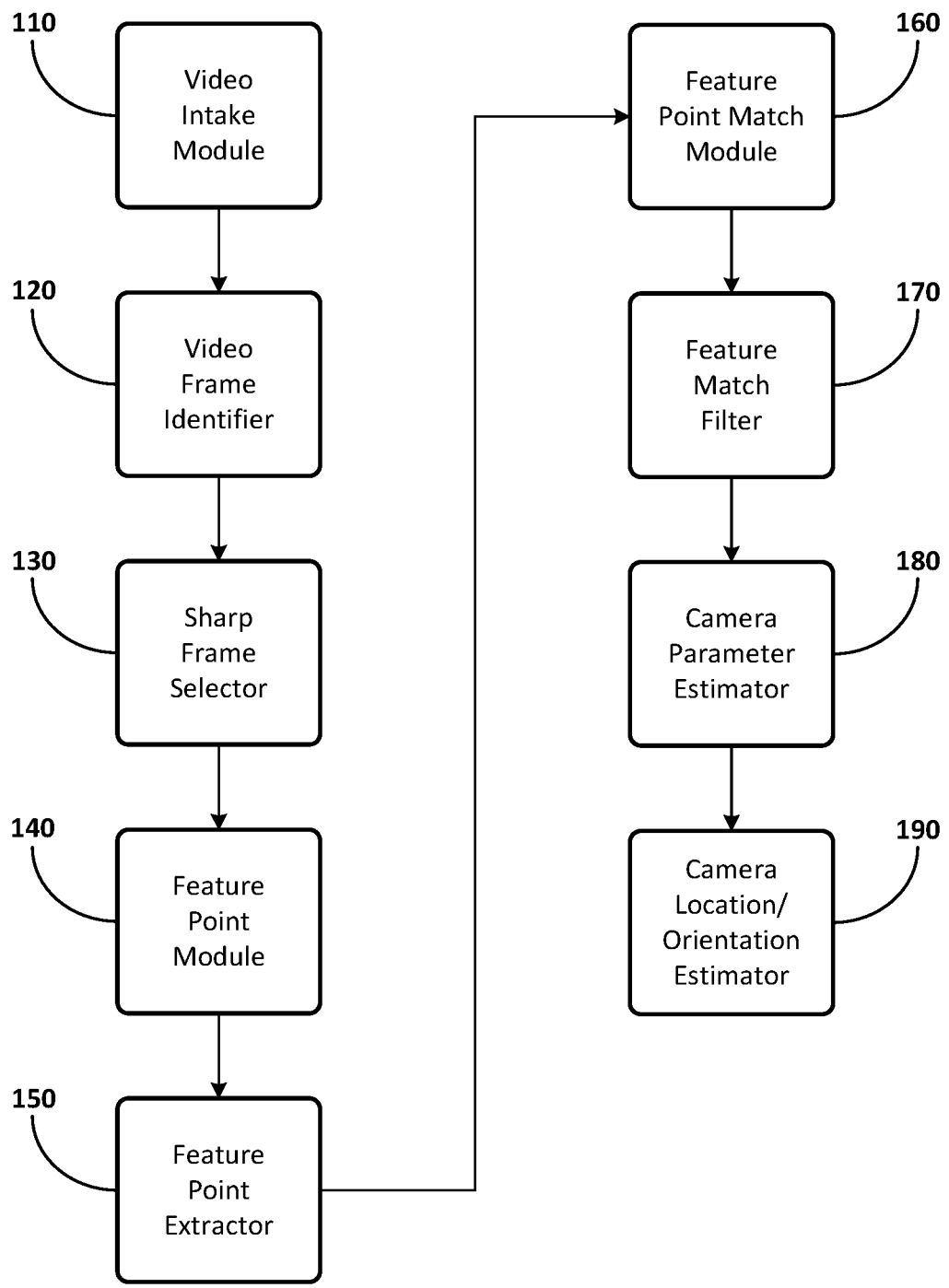
Figure 2C:
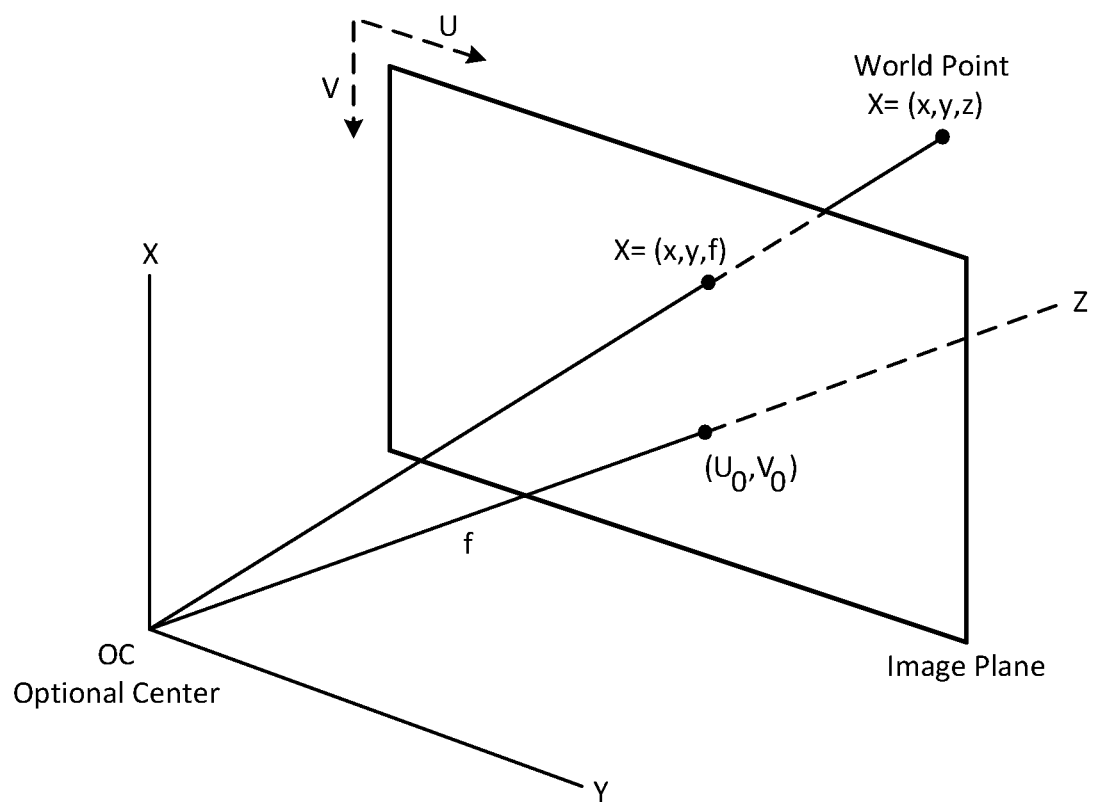

FIGS. 2A-2C illustrate an example system for estimating locations and orientations of multiple cameras based on video clips recorded by the cameras. In FIG. 2A, system 20 includes processor 22, memory 24, input/output 26 and data store 30, all of which are coupled by data and communications bus 28. The data store 30 includes database 32 and system 100, which may be implemented on a non-transitory computer-readable storage medium. The system 100 includes instructions that when executed by processor 22 provides for estimating locations and orientations of multiple cameras based on video clips provided by the cameras. The video clip data may be stored in the database 32.

FIG. 2B illustrates example components of system 100. In FIG. 2B, system 100 includes video intake module 110, video frame identifier 120, sharp frame selector 130, feature point module 140, feature point extractor 150, feature point match module 160, feature match filter 170, camera focal parameter estimator 180, and camera location and orientation estimator 190.

Video intake module 110 receives raw video data for the video clips to be analyzed and performs initial processing of the data; in an aspect, the module 110 defines a common time reference and extracts any camera metadata that may be recorded with the video clips. For example, the video metadata may include length of the recording and frame rate.

Video frame identifier 120 identifies frames of the video clips to be used in the camera position estimates. The video frame identifier 120 may be used to set threshold values for other components of the system 100.

The sharp frame selector 130 performs a filtering process over the frames of a video clips. As noted above, user-generated recordings of popular events tend to be unstable, with camera-shake and low-cost sensor hardware leading to many blurry frames. Such blurry frames may not be useful for accurate extraction of feature points.

In a first filtering process, sharp frame selector 130 selects the sharpest frame (or frames) in time intervals of a specified length. At a frame rate of 30 frames per second, a five minute video clip will have 9000 frames. With a 1920×1280 pixel resolution, exhaustive processing would have to consider 22 billion pixels. For reasons of computational tractability, the sharp frame selector 130 culls a video clip to produce a manageable collection of frames. The frame selector 130 uses a relative blurriness measure that compares blurriness between frames of video clip video clip. The sharp frame selector 130 may perform this comparison using a sliding window approach. The sliding window may be set to two seconds, for example. Selection of the sliding window size involves a tradeoff between ensuring that brief changes in the video scenes are not lost and excessive repetition of barely changing scenes. An operator (human) may select the window size based on the dynamic characteristics of the video clips. Alternately, the window size may have a default setting (two seconds) or may be determined by the sharp frame selector 130 using an algorithm that considers the subject matter of the video clips, for example.

Feature point module 140 identifies, for each selected sharp frame, the number of feature points in the selected sharp frame (using a feature point detection process such as a gradient change of a threshold amount). The feature point extractor 140 then selects a specified number of frames (e.g., 10 sharp frames) having the most feature points (in FIG. 1, examples of feature points include edges of towers 2 and 3 and structure 4). The number of frames to be selected may be the function of the length of the video clip and the nature, or subject of the video clip.

The net result of processing the video clips by the frame selector 130 and the feature point module 140 is a small size, filtered set of frames for each video clip for subsequent analysis by components of the system 100. The filtered set of frames (e.g., 10 per video clip) should have as little blur as possible and as many feature points as possible.

The feature point extractor 150 processes all of the highest scoring frames with an algorithm that obtains a set of key feature point descriptors and respective location information for the descriptors for each frame.

Feature point match module 160 processes the filtered sets of frames (that is, the highest scoring frames in terms of sharpness and feature points) from each video clip and matches each frame of each set against each frame of every other set. Matches may be determined from fixed background structures such as the key feature point descriptors.

The feature match filter 170 then selects the matches having the highest count to use in computing a modal scale and orientation estimate for each camera. That is, matching frames falling within the histogram bin having the highest count are used for subsequent processing. In an embodiment, an output of the feature match module 160 and the feature match filter 170 is a set of histograms of scale and orientation considering all matches determined by the module 160.

Camera parameter estimator 180 estimates video camera parameters such as camera focal length. The cameral parameter estimator 180 exploits the fact that if two image-planes formed from two frames are related by some rotation, the camera must lie at the point where the plane normals intersect, thus resolving any camera depth ambiguity, as can be seen with reference to FIGS. 3A-3C. Furthermore, detection of zooming in a video clip may be possible by monitoring changing spacing of common feature points between frames.

In an embodiment, the estimator 180 constructs an intrinsic camera matrix as:

$$K = \begin{matrix} \alpha_x & \gamma & u_0 \\ & \alpha_y & v_0, \\ & & 1 \end{matrix}$$

where $\alpha_x$ and $\alpha_y$, express the optical focal length in pixels in the x and y directions, respectively, $\gamma$ is the pixel skewness coefficient, and $u_0$ and $v_0$ are coordinates of a principal point—where the camera's optical axis cuts the image plane. See FIG. 2C. The values for $\alpha_x$ and $\alpha_y$ may be estimated using a pair of suitably-chosen frames, as in FIGS. 3A-3C, so long as some camera rotation (in the x-y plane) occurs between frames. Candidate frame-pairs may be selected by ensuring a reasonable pixel coordinate displacement of key feature points from one frame to another. The selected frames need not be sequential.

Since the values of $\alpha$ can change over time, if a change of zoom level occurs, the system 100 may estimate the values from the frames whose features will be used in three-dimensional reconstruction. Values of $\alpha$ estimated at a different zoom level may lead to poor reconstruction otherwise. In system 100, the frame that has the greatest number of filtered feature matches with another frame in a different video is selected as the frame used in reconstruction, and hence is one of the pair used in the $\alpha$ estimation. The second frame of the pair is chosen by referring back to the blurriness measure, in the chosen time window about the reconstruction frame, and applying the above described matching and filtering processes of techniques described above to those frames with a low relative blurriness. The frame having the greatest number of feature matches, some two-dimension key feature point displacement, and no apparent inter-key feature point scaling (which is indicative of zooming) is selected.

The focal length estimation is sensitive to rotations between the frames used in the reconstruction, and reliable independent estimation of $\alpha_x$ and $\alpha_y$ depends on having some rotation of the camera. If no such rotation is apparent from two-dimensional key feature point displacement, the system 100 may select one of the other top ten frames, and find for the frame, a frame pair that does have some small axial rotation.

Camera position and orientation estimator 190 provides an estimate of the camera's location and orientation. Equipped with internally calibrated cameras, and mostly correct feature matches between video sequences, the estimator 190 performs an extrinsic calibration, estimating the rotations and translations between each of the video cameras. Following this processing, the estimator 190 provides estimates of relative camera locations and orientations of all cameras used for recording the video clips.

Figure 3A:
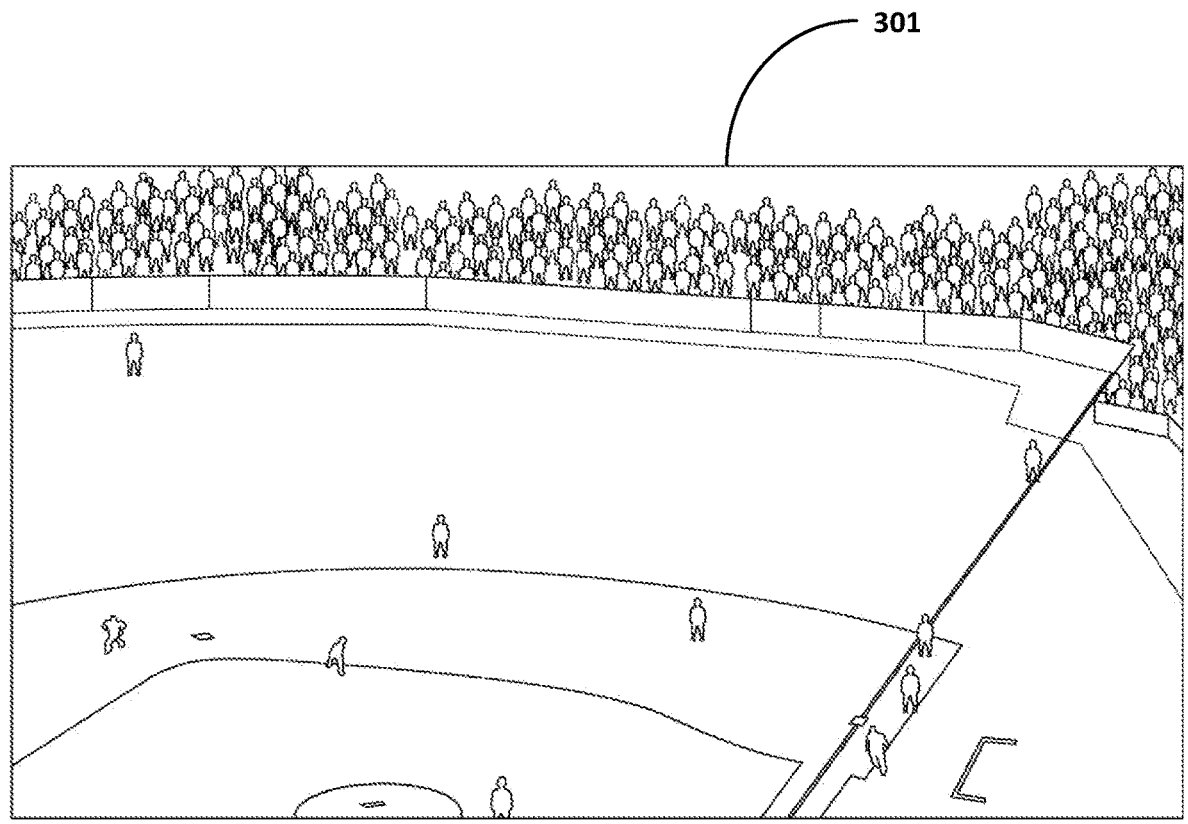
FIGS. 3A-3C illustrate an example camera location estimation.
Figure 3B:
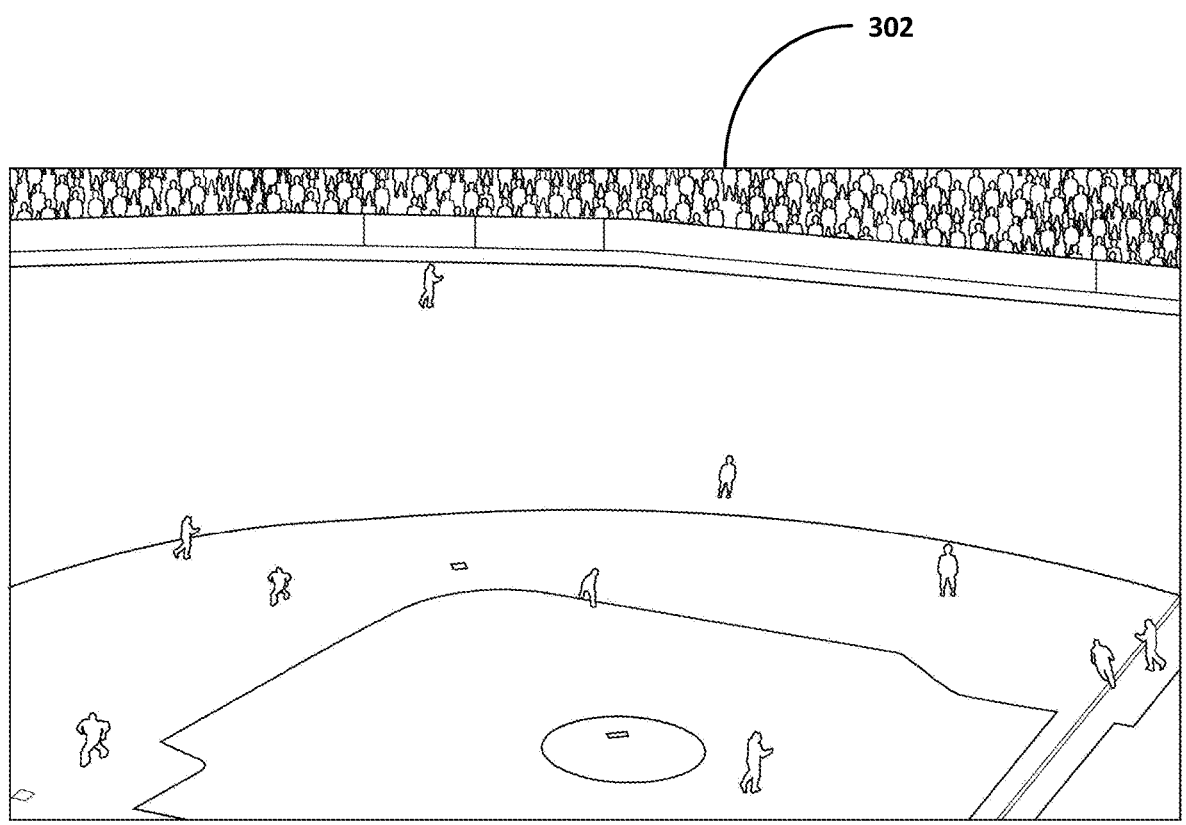
Figure 3C:
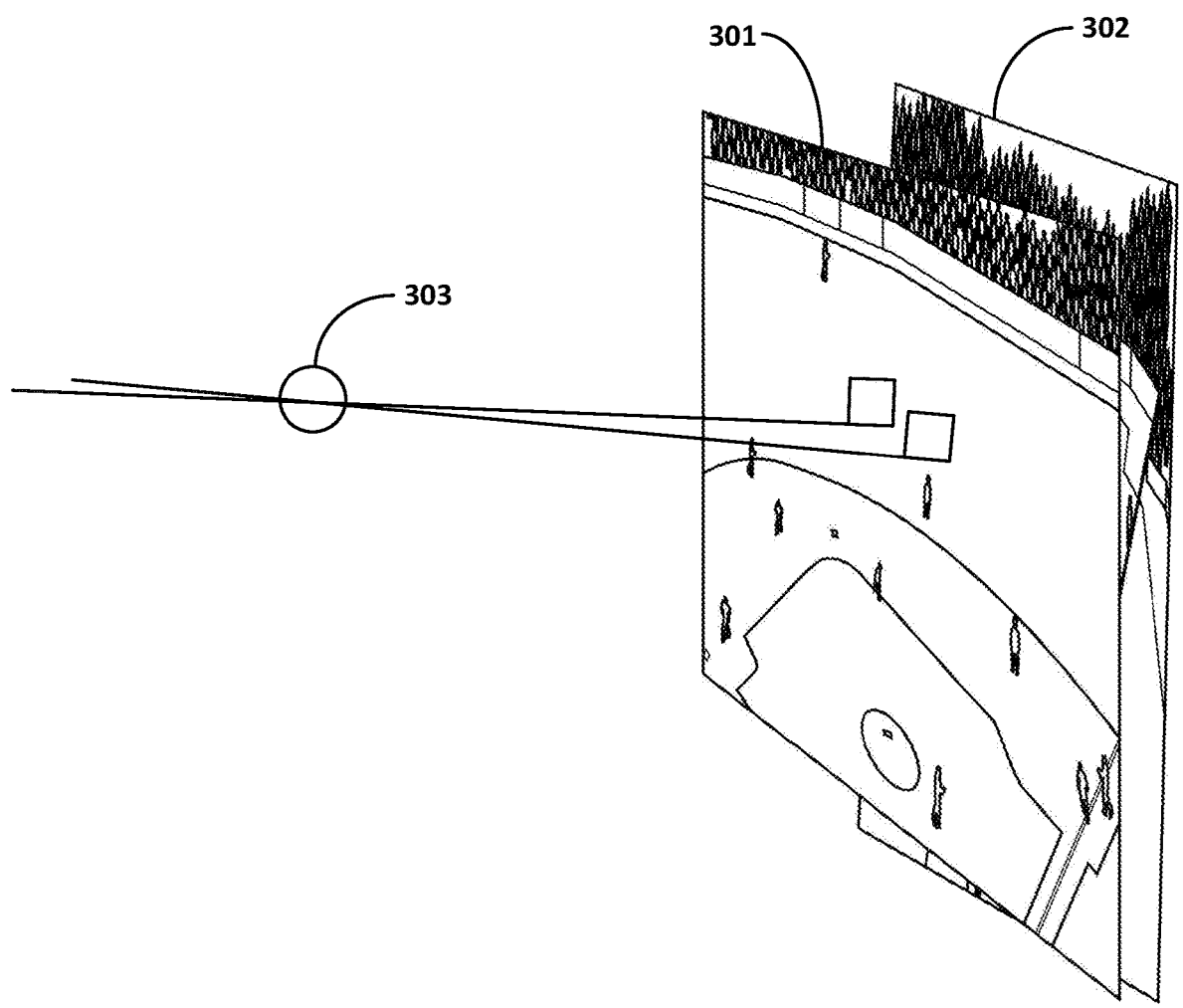

FIGS. 3A-3C illustrate an aspect of an example camera location and orientation estimation process. Having internal calibration data for the camera(s) may improve the accuracy of a three-dimensional reconstruction of feature points in a camera view into a real world space. However, as noted above, apparent camera position (e.g., camera C6 of FIG. 1) may be affected by camera zoom; that is, the camera parameters may make a camera located away from a real world object appear much closer than the camera actually is.

Contemporary video formats do not include metadata such as may be found, for example, in a JPEG file. Accordingly, the system 100 may exploit a video sequence in a different way. A series of frames close in time may capture almost the same scene and the camera's optical system is unlikely to vary during this time. Should the video camera rotate during this time, camera self-calibration may be possible, assuming negligible translation of the camera, relative to the distance to the real world objects. If two image-planes formed from two frames are related by some rotation, the camera that recorded the frames must lie at the point where the plane normals intersect, thus resolving any camera depth ambiguity, as can be seen with reference to FIGS. 3A-3C. Furthermore, detection of zooming in a video clip may be possible by monitoring changing spacing of common feature points between frames.

FIG. 3A illustrates a frame 301 from a video clip of a sporting event taken by a consumer-grade video camera. As shown, the camera view includes the first base line and a runner rounding second base.

FIG. 3B illustrates a subsequent frame 302 of the same video clip with the camera panned left to center on center field.

FIG. 3C shows the relationship of frames 301 and 302. As can be seen, the optical axis represented by lines 311 and 312 intersect at point D. Assuming no zooming, point D represents an estimate of the location of the camera.

FIGS. 4-8 are flowcharts illustrating example methods for estimating positions of multiple video cameras.

Figure 4:
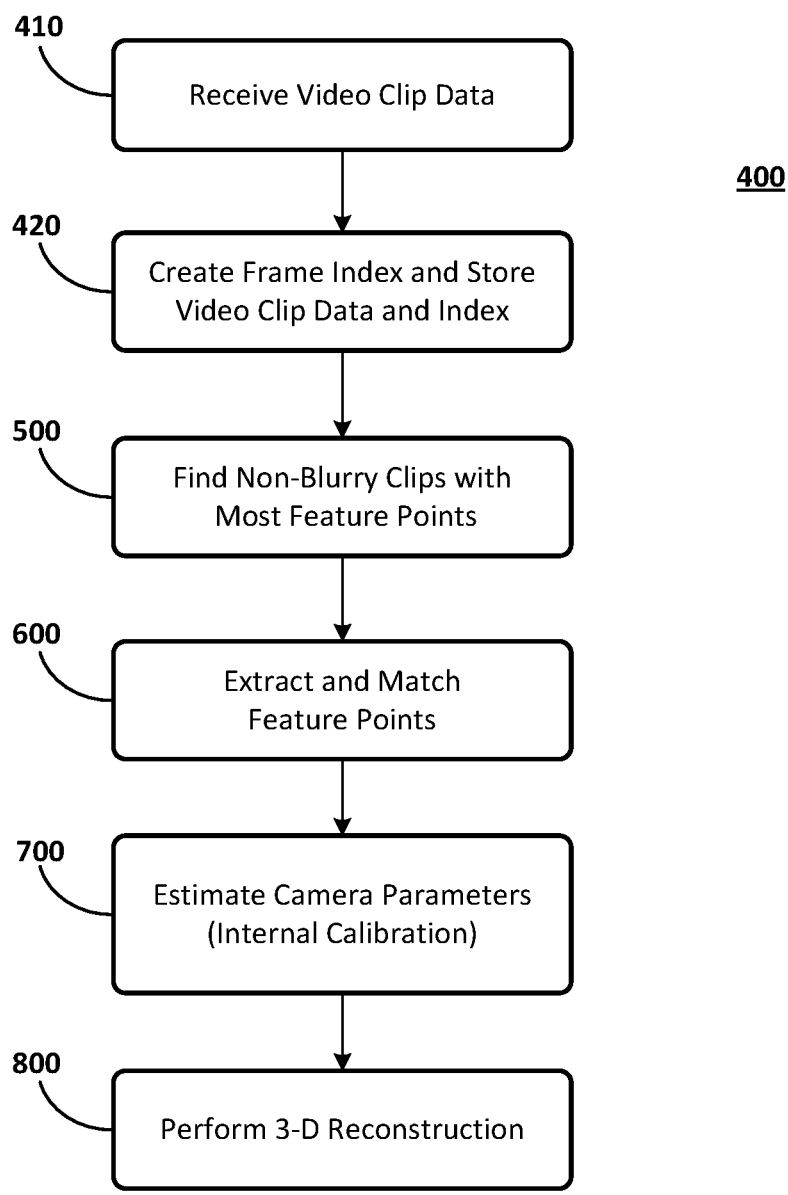
FIGS. 4-8 are flowcharts illustrating example methods for estimating positions of multiple cameras.

FIG. 4 illustrates an overall method 400 for determining relative positions of video cameras recording an event. In block 410, system 100 receives as an input, video data for two or more video clips, each of the video clips being recorded by a different video camera. In block 420, the system 100 creates a frame index, assigns each frame of the video clips a sequential number, and stores the frame index and the video data for subsequent processing by other components of the system 100.

In block 500, the system 100 finds non-blurry frames with many feature points from each video clip. In block 600, the system 100 extracts and matches feature points, with a high degree of confidence, from one frame to another frame, both between frames from one video clip, and between frames from differing video clips. In block 700, the system 100 estimates the camera parameters (scale and orientation), inferring parameters of each camera's optical system (that is, the system 100 performs an internal calibration for each camera), such as focal length and pixel aspect ratio. In block 800, the system 100 performs a three-dimensional reconstruction, using the internal calibration parameters and matched feature point sets, calculating camera pose (extrinsic calibration) and three-dimensional scene coordinates.

Figure 5:
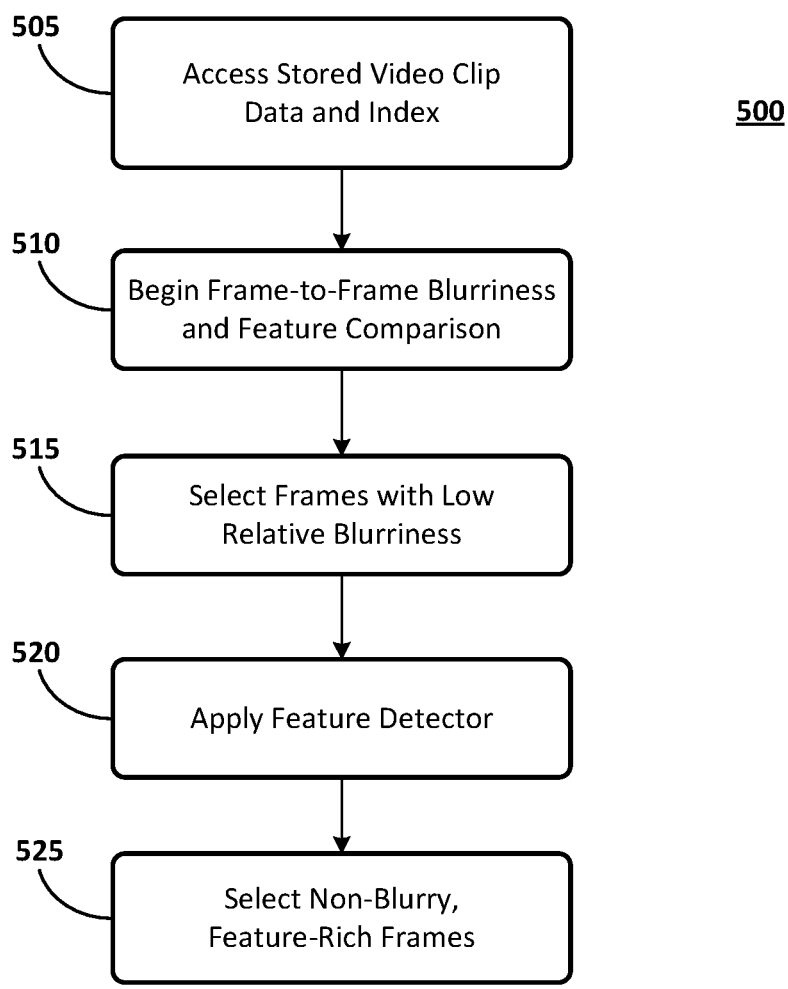

FIG. 5 is a flow chart of example frame selection process 500. In FIG. 5, block 505, the system 100 accesses stored data from each of the video clips, along with the frame index. In block 510, the system 100 begins a frame-to-frame comparison process to identify frames having low relative blurriness. In an embodiment, in block 510, the system 100 applies x- and y-direction filters to evaluate the relative blurriness of each frame of the video clip. Relative blurriness represents how much of a high frequency component of the video signal in a frame compares to that of neighboring frames. The system 100 may use an inverse of the sum of squared gradient measure to evaluate the relative blurriness. The blurriness measure yields relative image blurriness among similar images when compared to the blurriness of other images. The process of block 510 therefore, may be applied to a specific frame and a limited number of neighboring frames where significant scene change is not detected. Significant scene change may occur, for example, if the video camera is panned.

In block 515, the system 100 selects frames having a relatively low blurriness among all frames in the video clip. In an embodiment, the process of block 515 is completed over a sliding window of time. In an aspect the sliding window time may be set at two seconds. Thus, the system 100 may select one or more frames having the least blurriness out of all 120 frames in a two-second period.

In block 520, the system 100 applies a second filtering process to the sharp frames identified in block 515. The processing of block 520 begins when the system 100 applies a feature detector to each of the sharp frames. The system 100 then counts the number of features in each sharp frame. In block 525, the system 100 selects a specified number of sharp frames having a highest count of features. In an embodiment, the system, in block 525, selects ten frames for a video clip of about five minutes. For longer duration video clips, the system 100 may select more than ten frames. Following the processing of block 525, the method 500 moves to the processing of block 605.

Figure 6:
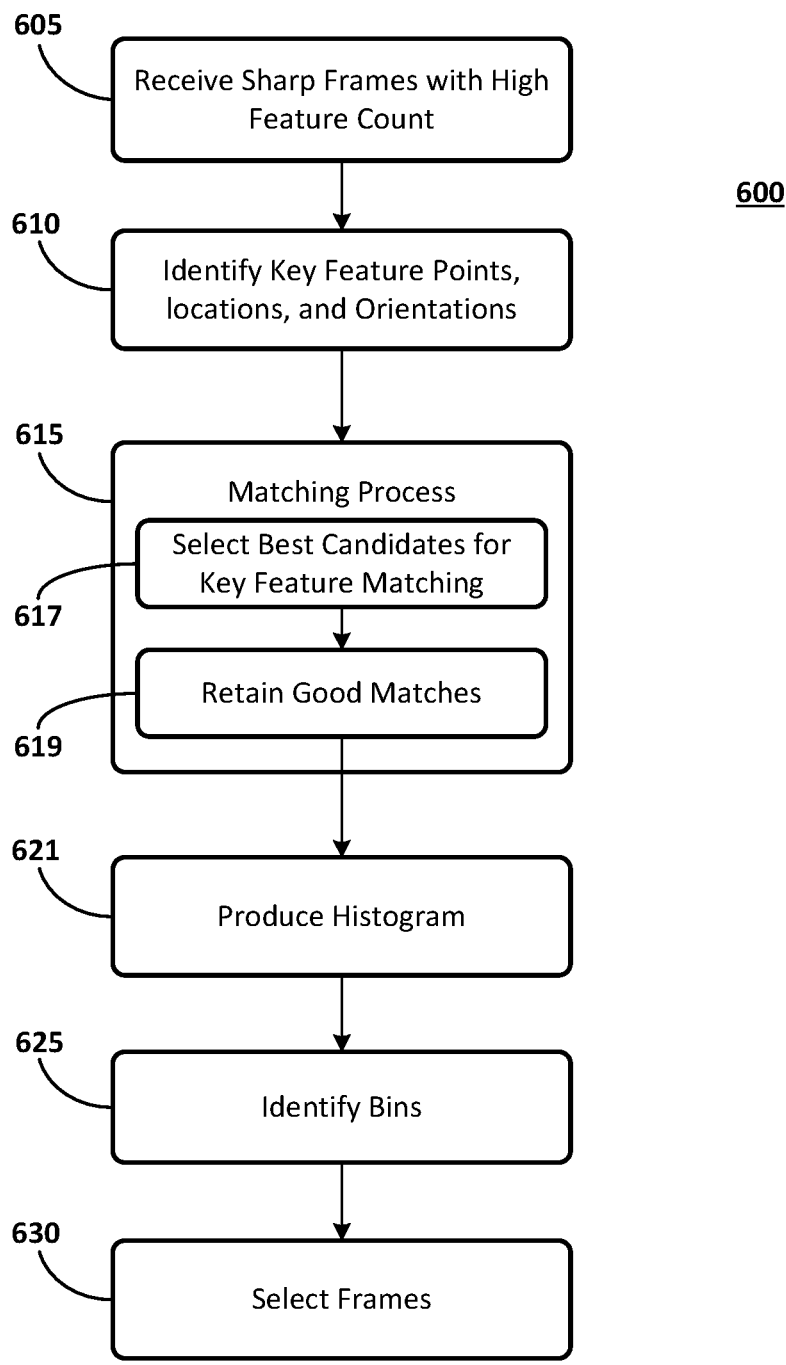

FIG. 6 is a flow chart of example feature matching method 600. In FIG. 6, method 600 begins in block 605 when the system 100 receives the identities of the (ten) sharp frames with high feature counts as a determined by the processing of method 500. In block 610, the system 100 processes the identified frames for each video clip to identify key feature points and determine location information for each such key feature point. Such key feature points are suitable for matching differing images of an object or scene. The key feature points may be invariant to scale and rotation, and partially invariant to changes in illumination and camera viewpoint.

In a first stage of block 610, the system 100 searches over all scales and image locations to identify potential key feature points that do not vary in scale and orientation. In an example, a difference-of-Gaussian function may be used. Next, the key feature points are localized in the frame to determine their location and scale. Following, the key feature point orientations may be established. Finally, for each key feature point, local image gradients are measured at the selected scale in the region around each key feature point.

This process of block 610 transforms the video data into scale-invariant coordinates relative to key feature points. In an aspect, this process generates large numbers of features that can be extracted from a frame. In addition, the key feature points may be highly distinctive, which allows a single key feature point to be correctly matched with high probability against a large number of other key feature points.

In block 615, a matching process of the system 100 compares every frame of a video clip to every other frame in the video clip, and to every frame from every other video clip. The process of block 615 occurs in two stages. In block 617, the best candidate match for each key feature point is found by identifying its nearest neighbor in the selected frames. In an aspect, the nearest neighbor may be defined as a frame having a key feature point with minimum distance from the key feature point being analyzed. Some features in a frame may not have any correct match in another frame because they arise from background clutter or were not detected in the other frames. In an aspect, a more effective measure may be obtained by considering a ratio of the distance of the closest neighbor to that of the second-closest neighbor, and using a high threshold value for the ratio. This measure performs well because correct matches need to have the closest neighbor significantly closer than the closest incorrect match to achieve reliable matching.

In block 619, the matches from block 617 are filtered to retain good matches and discard poor matches. In an aspect, in block 619, the system 100 evaluates scale and orientation to distinguish good matches from poor matches. For good frame matches, the scale and orientation frame-to-frame need not be identical, but should be related. Scale may be related by an approximately constant factor and orientation by an approximately constant difference.

In block 621, the system 100 produces a histogram of scaling factors and orientation differences over all matches found to be good in block 619. The thus-constructed histogram may have bins of a predetermined width and a number of matches per bin.

In block 625, the system 100 identifies histogram bins having a highest number of matches and in block 630, selects frames from these highest count bins. Following block 630, the method 600 moves to processing in block 705.

Figure 7:
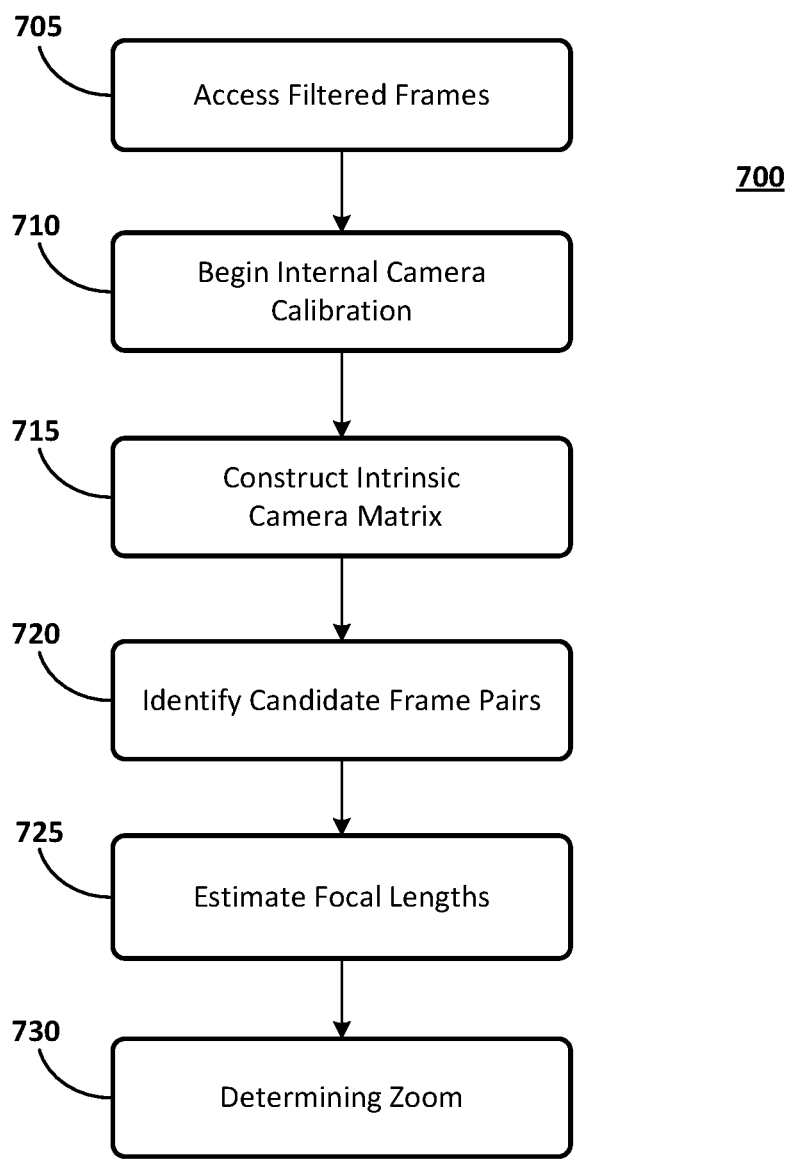

FIG. 7 is a flow chart of example camera focus parameter estimation method 700. In block 705, the system 100 accesses the filtered frames selected in method 600. In block 710, the system 100, in the absence of sufficient video camera metadata, begins execution of an internal calibration for each video camera from which a video clip was received.

In an embodiment, in block 715, the estimator 180 beginning construction of an intrinsic camera matrix of camera focal lengths, pixel skewness and principal point coordinates. See FIG. 2C. In block 720, the estimator 180 identifies candidate frames by determining frame pairs that show some two-dimensional displacement of key feature points, which is indicative of some x-y plane camera rotation. In block 725, the estimator 180 estimates values for focal lengths (expressed in x and y directions) using the pair of frames indicative of some camera rotation in the x-y plane.

In system 100, the frame that has the greatest number of filtered feature matches to another frame in a different video is selected as the frame used in reconstruction. In block 730, the estimator 180 determines if some zooming has occurred for the frames that may be used for three-dimensional reconstruction.

Since the values of $\alpha$ can change over time, if a change of zoom level occurs, the system 100 may estimate the values from the frames whose features will be used in three-dimensional reconstruction. Values of $\alpha$ estimated at a different zoom level may lead to poor reconstruction otherwise. In system 100, the frame that has the greatest number of filtered feature matches to another frame in a different video is selected as the frame used in reconstruction, and hence is one of the pair used in the $\alpha$ estimation. The second frame of the pair is chosen by referring back to the blurriness measure, in the chosen time window about the reconstruction frame, and applying the above described matching and filtering processes of techniques described above to those frames with a low relative blurriness. The frame with the greatest number of feature matches, some two-dimension key feature point displacement, and no apparent inter-key feature point scaling (which is indicative of zooming) is selected.

The focal length estimation is sensitive to rotations between the frames used in the reconstruction, and reliable independent estimation of $\alpha_x$ and $\alpha y$ depends on having some rotation of the camera. If no such rotation is apparent from two-dimensional key feature point displacement, the system 100 may select one of the other top ten frames, and find for it a paired frame that does have some small axial rotation.

Figure 8:
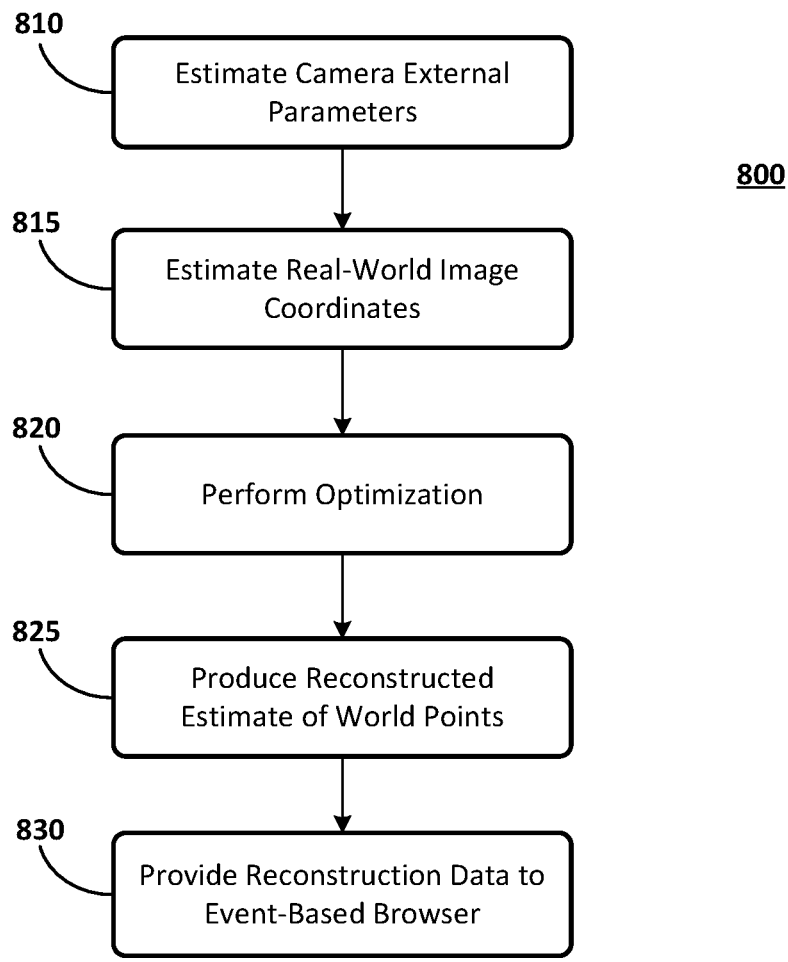

FIG. 8 is a flow chart illustrating an example three-dimensional reconstruction process 800. In block 805, with internal camera calibration data, and feature matches between video clips from the processes of FIG. 7, the system 100 begins a process of extrinsic camera calibration, which may involve estimating the rotations and translations of each video camera. In an embodiment, the method 800 then proceeds, in block 810, with an estimate of the camera external parameters by using observed pixel coordinates od a number of real world objects observed by the video cameras as seen in the video clips (e.g., the world point X in FIG. 2C). In block 815, the system 100 estimates the image coordinates of the real world objects using the observed pixel coordinates and the rotations determined by method 700. In block 820, the system 100 may apply an optimization process, such as a sum of squares process to improve the estimates. Further refinements may be applied. The result is, in block 825, a reconstructed estimate of the world points X. Following this process, all camera positions, are known, as desired. The by-product information of relative camera rotations and reconstructed 3D world points may be used then, in block 830, as an input to an event based browser system, and the process 800 ends. The methods and processes disclosed herein are executed using certain components of a computing system (see, for example, FIG. 2A). The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability.

The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flow charts and accompanying description to illustrate the embodiments represented in FIGS. 4-8. The disclosed devices, components, and systems contemplate using or implementing any suitable technique for performing the steps illustrated. Thus, FIGS. 4-8 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A method comprising:
receiving, by a processor, a video recording of a camera;
determining blurriness measures for a set of frames of the video recording;
identifying feature points in multiple frames of the set;
selecting a plurality of frames from the set based on the blurriness measures and the identified feature points, wherein the plurality of frames of the video recording comprise a first frame before a rotation of the camera and a second frame after the rotation of the camera, wherein the first frame and the second frame each include a particular image feature;
identifying an intersection of a normal corresponding to the particular image feature of the first frame and a normal corresponding to the particular image feature of the second frame, wherein the intersection corresponds to a location of the camera;
calculating a focal parameter of the camera based on the intersection; and
determining, based on the calculated focal parameter, a position of the camera relative to an object associated with the particular image feature.

2. The method of claim 1, wherein determining the blurriness measures comprises determining how much of a high frequency component of a video signal in a particular frame of the video recording compares to high frequency components of video signals in neighboring frames of the video recording.

3. The method of claim 2, further comprising selecting the neighboring frames according to a pre-set time difference between the particular frame and the neighboring frames.

4. The method of claim 3, further comprising selecting at least one of the neighboring frames from frames having low blurriness measures, high feature point counts, and non-zero rotation with respect to the particular frame.

5. The method of claim 1, wherein determining the position of the camera further comprises processing a frame of the video recording and a frame of a video recording of a second camera to estimate the location and an orientation of the camera relative to the second camera, wherein the processing, comprises:
feature mapping;
camera internal calibration; and
camera external calibration.

6. The method of claim 5, wherein the feature mapping comprises:
identifying key feature points that do not vary in scale and orientation beyond a threshold amount in multiple frames of the set of frames;
determining orientations of a plurality of the identified key feature points;

comparing a frame of the set of frames of the video recording to multiple frames of a video recording of a second camera;

determining a matching frame by identifying a neighboring frame having one or more of the same key feature points;

selecting matched frames having similar scale and orientation;

sorting the selected matched frames into bins; and selecting frames from bins having a highest count of sorted frames.

7. The method of claim 1, further comprising:

identifying a frame pair from the video recording that comprises a two-dimensional displacement of one or more key feature points, wherein the frame pair comprises the first frame and the second frame;

determining the normals from image planes of the frame pair; and calculating a focal length based on a distance between a point of the intersection and a point on one of the image planes.

8. The method of claim 7, wherein identifying the frame pair comprises:

selecting the first frame from the plurality of frames in the video recording based on a number of key features that match with a frame in a video recording of a second camera; and selecting the second frame from the plurality of frames based on one or more of the blurriness measures.

9. The method of claim 7, wherein the external camera calibration comprises:

estimating real-world image coordinates; and providing reconstructed estimates of world points.

10. A system comprising:

a processor; and a computer-readable storage medium having instructions that when executed by the processor, cause the processor to:

determine blurriness measures for a set of frames of a video recording of a camera;

identify feature points in multiple frames of the set;

select a plurality of frames from the set based on the blurriness measures and the identified feature points, wherein the plurality of frames of the video recording comprise a first frame before a rotation of the camera and a second frame after the rotation of the camera, wherein the first frame and the second frame each include a particular image feature;

identify an intersection of a normal corresponding to the particular image feature of the first frame and a normal corresponding to the particular image feature of the second frame, wherein the intersection corresponds to a location of the camera;

calculate a focal parameter of the camera based on the intersection; and determine, based on the calculated focal parameter, a position of the camera relative to an object associated with the particular image feature.

11. The system of claim 10, wherein to determine the blurriness measures, the processor determines how a high frequency component of a video signal in a particular frame of the video recording compares to high frequency components of video signals in neighboring frames of the video recording.

12. The system of claim 11, wherein the processor selects at least one of the neighboring frames according to a pre-set time difference between the particular frame and the at least one neighboring frame.

13. The system of claim 12, wherein the processor selects a neighboring frame from the video recording that has a low blurriness measure, a high feature point count, and a non-zero rotation with respect to the particular frame.

14. The system of claim 10, wherein the processor further executes feature mapping, and wherein the feature mapping causes the processor to:

identify key feature points that do not vary in scale and orientation beyond a threshold amount in multiple frames of the video recording;

determine orientations of a plurality of the identified key feature points;

compare a frame of the video recording to multiple frames of a second video recording of a second camera;

determine a matching frame by identifying a corresponding frame from the second video recording that has one or more of the key feature points;

select a plurality of matching frames that have similar scale and orientation;

sort the plurality of matching frames into bins; and select final frames from bins having a highest count of sorted frames.

15. The system of claim 10, wherein the processor is further to:

identify a frame pair from the video recording that comprises two-dimensional displacement of one or more key feature points, wherein the frame pair comprises the first frame and the second frame;

determine the normals from image planes of the frame pair; and calculate a focal length based on a distance between a point of the intersection and a point on one of the image planes.

16. A non-transitory machine-readable storage medium comprising instructions that cause a processing device to:

receive a video recording of a camera;

identify feature points in multiple frames of the video recording;

determine blurriness measures for multiple frames of the video recording;

select a plurality of frames of the video recording based on the blurriness measures and the identified feature points, wherein the plurality of frames comprise a first frame before a rotation of the camera and a second frame after the rotation of the camera, wherein the first frame and the second frame each include a particular image feature;

identify an intersection of a normal corresponding to the particular image feature of the first frame and a normal corresponding to the particular image feature of the second frame, wherein the intersection corresponds to a location of the camera;

calculate a focal parameter of the camera based on the intersection; and determine, using the calculated focal parameter, a position of the camera relative to an object associated with the particular image feature.

17. The non-transitory machine-readable storage medium of claim 16, wherein the processing device is to select a neighboring frame according a pre-set time difference between a particular frame and the neighboring frame.

18. The non-transitory machine-readable storage medium of claim 17, wherein the processing device selects the neighboring frame that has a low blurriness, a high feature point count, and a non-zero rotation with respect to the particular frame.

19. The non-transitory machine-readable storage medium of claim 16, wherein the processing device is to:
 select the first frame from the plurality of frames of the video recording based on a number of key features that match with a frame in a video recording of a second camera; and
 select the second frame from the plurality of frames based on one or more of the blurriness measures.

20. The non-transitory machine-readable storage medium of claim 16, wherein the processing device is to:
 estimate real-world image coordinates; and
 provide reconstructed estimates of world points.

* * * * *